US008498395B2

United States Patent
Ramanathaiah

(10) Patent No.: US 8,498,395 B2
(45) Date of Patent: Jul. 30, 2013

(54) AUTOPLAY OF STATUS IN TELECONFERENCE VIA EMAIL SYSTEMS

(75) Inventor: Gurudutta Ramanathaiah, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 577 days.

(21) Appl. No.: 12/729,658

(22) Filed: Mar. 23, 2010

(65) Prior Publication Data

US 2011/0235787 A1 Sep. 29, 2011

(51) Int. Cl.
*H04M 3/42* (2006.01)
(52) U.S. Cl.
USPC .............. 379/202.01; 379/93.21; 379/158; 370/260; 455/416
(58) Field of Classification Search
USPC ............ 379/88.16, 88.19, 88.22, 202.01, 379/88.13, 88.14, 93.21, 158, 205.01; 370/260–262, 271; 455/416
See application file for complete search history.

(56) References Cited

U.S. PATENT DOCUMENTS

| | | | |
|---|---|---|---|
| 5,408,518 A | 4/1995 | Yunoki | |
| 5,914,747 A | 6/1999 | Hamilton | |
| 6,195,117 B1 | 2/2001 | Miyazaki | |
| 6,353,456 B1 | 3/2002 | Sato | |
| 7,308,476 B2 | 12/2007 | Mannaru et al. | |
| 7,567,662 B1 | 7/2009 | Renner et al. | |
| 7,570,752 B2 * | 8/2009 | Jachner | 379/202.01 |
| 2004/0161090 A1 * | 8/2004 | Digate et al. | 379/202.01 |
| 2006/0023915 A1 | 2/2006 | Aalbu et al. | |
| 2007/0214217 A1 | 9/2007 | Ueno et al. | |
| 2008/0084984 A1 * | 4/2008 | Levy et al. | 379/202.01 |
| 2008/0159511 A1 | 7/2008 | Keohane et al. | |

OTHER PUBLICATIONS

Connect-Anytime; Web Conference User Guide; http://acceris.com/business/productinfo/Web_Conf_User_Guide.pdf.
Video Teleconference Service—Free Interrelated Info for Teleconference Equipments; http://www.articledashboard.com/Article/Video-Teleconference-Service-Free-Interrelated-Info-For-Teleconference-Equipments/714582.

* cited by examiner

*Primary Examiner* — Md S Elahee
(74) *Attorney, Agent, or Firm* — Miles & Stockbridge P.C.

(57) ABSTRACT

A computer-implemented method for auto play of a status in a telephone conference is provided. The method includes receiving, at an e-mail server, a status message of a party to a telephone conference, and determining from the status message whether the party will be able to attend the telephone conference. When it is determined that the party cannot attend the telephone conference, the method further includes forwarding the status message to a voice box for conversion of the status message into audio that is saved in an audio file. The method may also include notifying a teleconference bridge that the party associated with the status message will not be able to attend the telephone conference. The teleconference bridge creates an entry in a repository indicating that the party will need a voice proxy from the audio file, and, during the telephone conference, the status of the party is provided to other parties to the telephone conference by playing the audio file.

20 Claims, 4 Drawing Sheets

| Entry | Description |
|---|---|
| User | Identification of user by name and/or id |
| Conference ID | Identification of telephone conference |
| Time | Time of telephone conference and/or time to play voice message |
| Location of voice message | Identification of location where voice message is stored |

Fig. 4

AUTOPLAY OF STATUS IN TELECONFERENCE VIA EMAIL SYSTEMS

BACKGROUND

1. Field

Embodiments of the invention are generally related to computer systems and, in particular, systems which control telecommunications and teleconferencing via email systems.

2. Description of the Related Art

Telephone conferencing, sometimes referred to as teleconferences or conference calls, is the real-time exchange of information among several persons and/or machines remote from one another but linked by a telecommunications system. Through teleconferencing, companies can conduct meetings, customer briefs, training, demonstrations and workshops by phone or online instead of in person. A telecommunications system may facilitate the teleconference by providing audio, video, and/or data services via telephones, computers, televisions or other communications media.

In many instances, teleconferences connect parties through a conference bridge, which is essentially a server that can receive and route multiple calls simultaneously. The conference bridge may then link to a private branch exchange (PBX), which is a switch that routes calls to all the different internal phone extensions within a company or building. Teleconferences may also utilize voice over internet protocol (VoIP) technology in which the phone calls are made over the internet and data is packet switched. Many teleconference systems require a login and/or a personal identification number (PIN) to access the system. This helps protect confidential and proprietary information during the call.

SUMMARY

In one embodiment, a computer-implemented method for auto play of a status in a telephone conference is provided. The method includes receiving, at an e-mail server, a status message of a party to a telephone conference, and determining from the status message whether the party will be able to attend the telephone conference. When it is determined that the party cannot attend the telephone conference, the method further includes forwarding the status message to a voice box for conversion of the status message into audio that is saved in an audio file. The method may also include notifying a teleconference bridge that the party associated with the status message will not be able to attend the telephone conference. The teleconference bridge creates an entry in a repository indicating that the party will need a voice proxy from the audio file, and, during the telephone conference, the status of the party is provided to other parties to the telephone conference by playing the audio file.

BRIEF DESCRIPTION OF THE DRAWINGS

For proper understanding of the invention, reference should be made to the accompanying drawings, wherein:

FIG. 4 illustrates a table according to one embodiment.

DETAILED DESCRIPTION

While many telephone conference systems require a login or personal identification number to enter a call and identify the party, traditional telephone conference systems do not have a mechanism for automatically identifying the status of a party that has not logged in or is absent. In other words, in current telephone conference systems, when one of the participants is absent or cannot attend, their status will be not be known unless they have previously notified the initiator of the conference. Embodiments of the present invention overcome this drawback by providing a mechanism for automatically playing an audio status message, which outlines the status of the party, during the telephone conference. As a result, the status of any absent party will automatically be known to all participants in the telephone conference.

Figure 1:
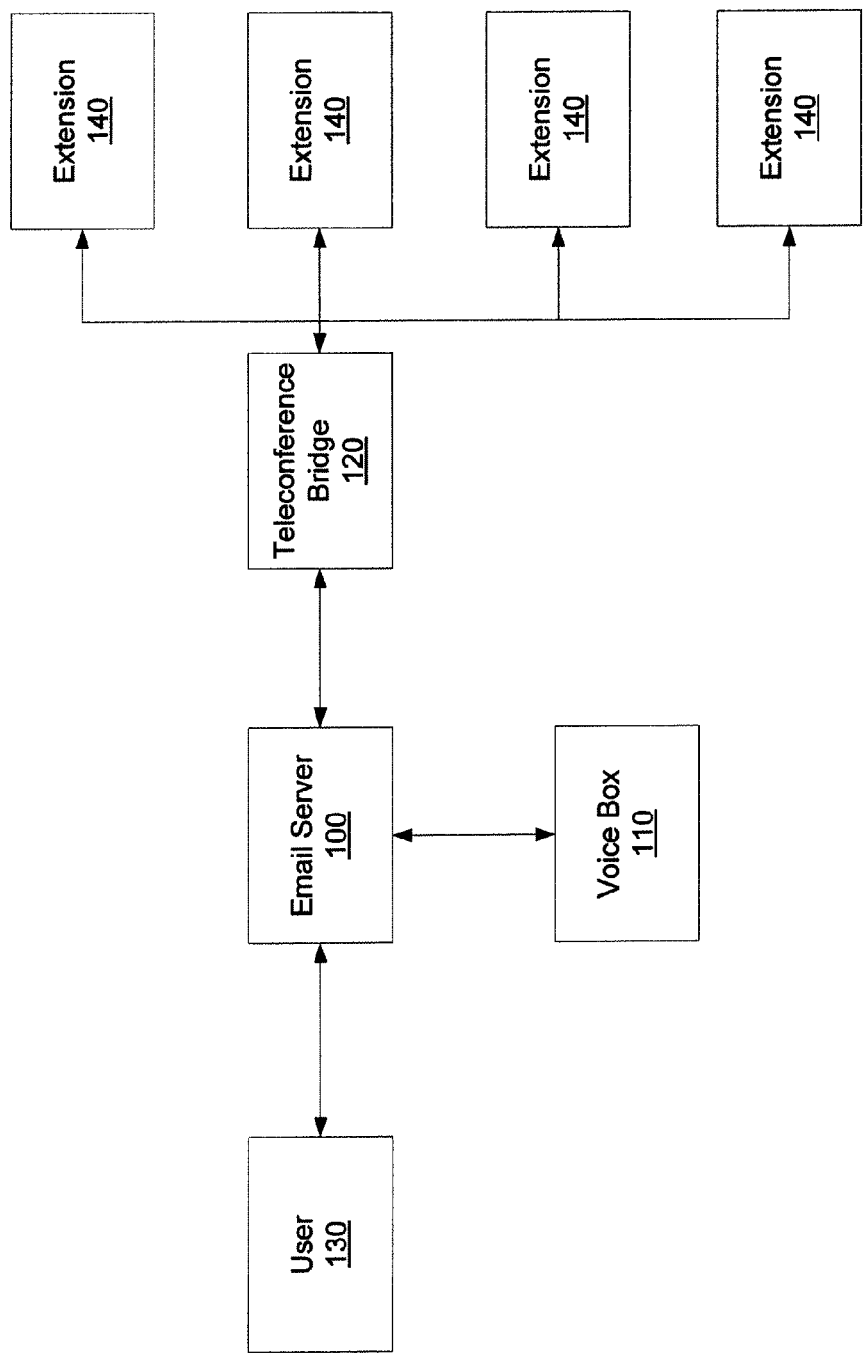
FIG. 1 illustrates a block diagram of a system according to one embodiment of the invention.

FIG. 1 illustrates a block diagram of a system according to one embodiment of the invention. The system includes an email server 100 that can receive, store, and transport email messages. In one example, email server 100 may include a mail transfer agent (MTA) as a computer process or software for transferring email from one computer to another. The MTA may receive the email from a user or another MTA. Transmission details of the email are specified by the Simple Mail Transfer Protocol (SMTP). If recipients of a given message are not hosted locally, the message is relayed to another MTA. Every time an MTA receives an email message, it adds a received trace header field to the beginning of the headers of the message in order to build a sequential record of MTAs handling the email.

According to one embodiment, when a user 130 will not be able to attend a scheduled telephone conference/meeting, the user 130 sends out an email as a status message and which includes certain tags in the body thereof. These tags may include, for example, the meeting id, the meeting pass code, the name of the user, the status of the user, and a true or false proxy indication. The email can be sent to a predefined distribution list, such as "voice-proxy_www" where this is the distribution list serving the whole organization or "voice-proxy_ABC" where "ABC" is the project name or ID such that this is a distribution list specific to that project.

The email may optionally include a discussion related to the status of a project associated with the telephone conference, and a discussion of any pending issues. For example, the email may have the following format:

@Meeting ID:
@Meeting PassCode:
@Name:
@Status:
@Proxy: true/false
Status of Project:
Pending Issues:
Thanks,
User Signature.

Alternatively, in other embodiments, a software extension, plug-in, or add-on may be used to automatically generate, populate and send the email status message on behalf of user 130. As a result, the user will save the time normally required to prepare the email since it will be automatically generated by the system.

In one example, email server 100 intercepts the email including the various tags discussed above and identifies it as a status message for which voice proxy may be required. Email server 100 parses the email to determine whether the user associated with the email needs to be proxied. This can be determined based on whether the proxy indication is true. When it is determined that the proxy indication is true and, therefore, the user will be absent from the telephone conference, the content of the email is converted from text to audio. Such a conversion may be performed by any text to audio converter. In one embodiment, the converter is included in the email server thereby providing the email server with functionality for converting the text of the email into audio that is saved in an audio file.

Alternatively, in other embodiments, to convert the text into audio, email server 100 may forward the email to voice box 110. Voice box 110 converts the text of the email message to audio, saves the audio converted text to a file, and returns the audio file to email server 100. Therefore, the file may include, for instance, a voice indication of the name of the absent user, the status of that user, and/or a status of the project and any issues associated therewith.

Once the conversion of the text to audio is completed, email server 100 sends an event to teleconference bridge 120. In one embodiment, teleconference bridge 120 may be any combination of hardware and/or software that provides the capability for two or more parties to communicate from separate locations via audio, video and/or computer systems. The event received from email server 100 may include information, such as the user id, meeting id, the meeting pass code, etc. In response to receiving this event, teleconference bridge 120 will create an entry in its repository to indicate that, for the meeting id associated with the received event, there is a member who will need voice proxy. In other words, teleconference bridge 120 will create a record, for the telephone conference identified in the email status message, that indicates that the user who sent the email status message will not be attending the telephone conference and will require voice proxy. In one embodiment, the record created by teleconference bridge 120 is a table as illustrated in FIG. 4. The table shown in FIG. 4 includes at least an entry that identifies the user, an entry that identifies the conference, an entry for the time of the conference and/or the time to play the voice message, and an entry that identifies the location where the voice message. According to one embodiment, the table of FIG. 4 is stored in a database, as will be discussed in more detail below. In some embodiments, the table of FIG. 4 may be deleted from the database after a predetermined period of time based, for example, on the configuration of email server 100.

When the telephone conference begins or at the scheduled time of the telephone conference, teleconference bridge 120 will automatically log-in for the absent user 130 utilizing the meeting id and pass code provided by email server 100. In one embodiment, teleconference bridge 120 will also cause the system to audibly state "proxying for name" where "name" is the name of absent user 130 as provided in the email status message. In addition, according to one embodiment, when all parties 140 to the telephone conference are logged-in, the teleconference bridge 120 may cause the system to immediately play the audio file created by voice box 110 that includes the status of user 130. For example, in one embodiment, the audio file can be played when the meeting starts and may be preceded by a message such as "Now playing proxy messages." As a result, the attending parties will know that proxy messages are being played and are subsequently provided with the detailed status of any absent parties via the audio file.

Alternatively, according to another embodiment, teleconference bridge 120 may await a request from the initiator of the telephone conference for the status of user 130. For example, the initiator of the telephone conference may state "please let me know your status" and teleconference bridge 120 will understand this request as a request for the status of user 130 and play the audio file in response. As a result, all parties/extensions 140 to the telephone conference are able to hear the status of any absent party. This may be especially useful if any of the parties/extensions 140 do not have access to email or have some dependency upon the absent user 130. Once the telephone conference is completed, the entry in the repository associated with that telephone conference and user 130 is deleted.

Extensions 140 may include a telephone, computer, laptop, PDA, and/or any other communications device. According to some embodiments, the extensions 140 may communicate with the teleconference bridge 120 via a private branch exchange (not shown). A private branch exchange is a telephone switch that connects the internal extensions of a business, and also connects those extensions to the public switched telephone network (PSTN) via trunk lines.

Figure 2:
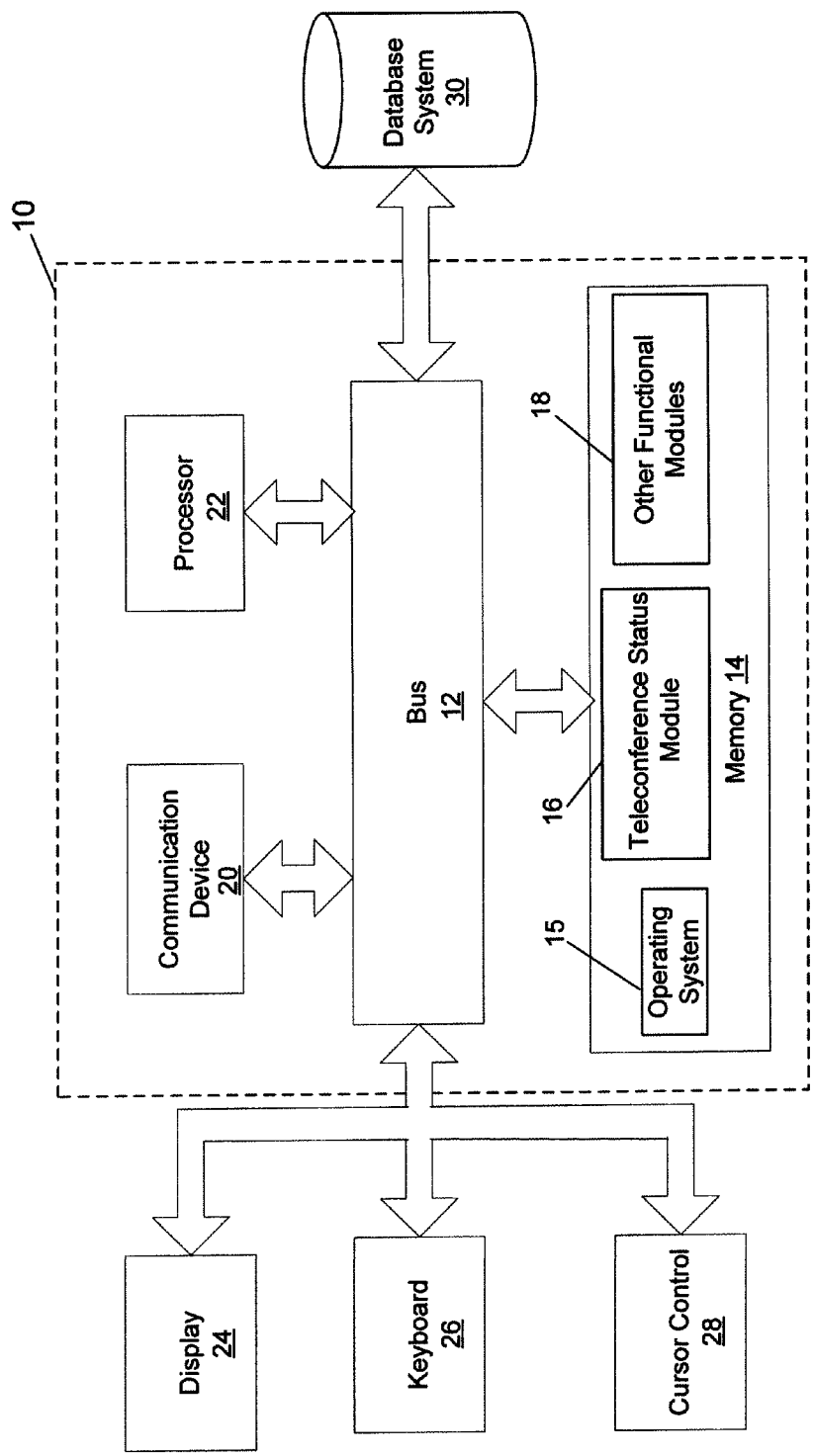
FIG. 2 illustrates an block diagram of an apparatus according to an embodiment.

FIG. 2 illustrates a block diagram of a system 10 that may implement one embodiment of the invention. In some embodiments, system 10 is email server 100 as discussed above. System 10 includes a bus 12 or other communications mechanism for communicating information between components of system 10. System 10 also includes a processor 22, coupled to bus 12, for processing information and executing instructions or operations. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. System 10 further includes a communication device 20, such as a network interface card or other communications interface, to provide access to a network. As a result, a user may interface with system 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user, such as configuration information. A keyboard 26 and a cursor control device 28, such as a computer mouse, are further coupled to bus 12 to enable a user to interface with system 10. Processor 22 and memory 14 may also be coupled via bus 12 to a database system 30 and, thus, may be able to access and retrieve information stored in database system 30. Although only a single database is illustrated in FIG. 2, any number of databases may be used in accordance with certain embodiments. In some embodiments, database system 30 may store information from an email status message, such as a meeting id, pass code, and/or status, as discussed above.

In one embodiment, memory 14 stores software modules that provide functionality when executed by processor 22. The modules may include an operating system 15 that provides operating system functionality for system 10. The memory may also store a teleconference status module 16, which provides for the automatic playback of a user's status during a telephone conference. In order to do so, teleconference status module 16 receives an email status message of a party to a telephone conference, and determines from the status message whether the party will be able to attend the telephone conference. When the teleconference status module 16 determines that the party cannot attend the telephone conference, it converts the text of the status message into audio. In some embodiments, the conversion of the email status message to audio includes forwarding the status message to a text-to-voice conversion module (not shown) for conversion of the status message into audio that is saved in an audio file, and receiving the audio file back from the voice box module. In some embodiments, the text-to-voice conversion module is a software component, or combination hardware and software component, stored in memory 14.

Teleconference status module 16 also notifies a teleconference bridge that the party associated with the status message will not be able to attend the telephone conference. As a result, during the telephone conference, the status of the party is provided to other parties to the telephone conference by playing the audio file.

System 10 may also include one or more other functional modules 18 to provide additional functionality. For example, functional modules 18 may include a text-to-voice conversion module or any modules related to an enterprise email system.

Database system 30 may include a database server and any type of database, such as a relational or flat file database. Database system 30 may store information from an email status message, such as a meeting id, pass code, and status, and/or any other data required by the teleconference status module 16, or data associated with system 10 and its associated modules and components.

In certain embodiments, processor 22, teleconference status module 16, and other functional modules 18 may be implemented as separate physical and logical units or may be implemented in a single physical and logical unit. Furthermore, in some embodiments, processor 22, teleconference status detector module 16, and other functional modules 18 may be implemented in hardware, or as any suitable combination of hardware and software.

Figure 3:
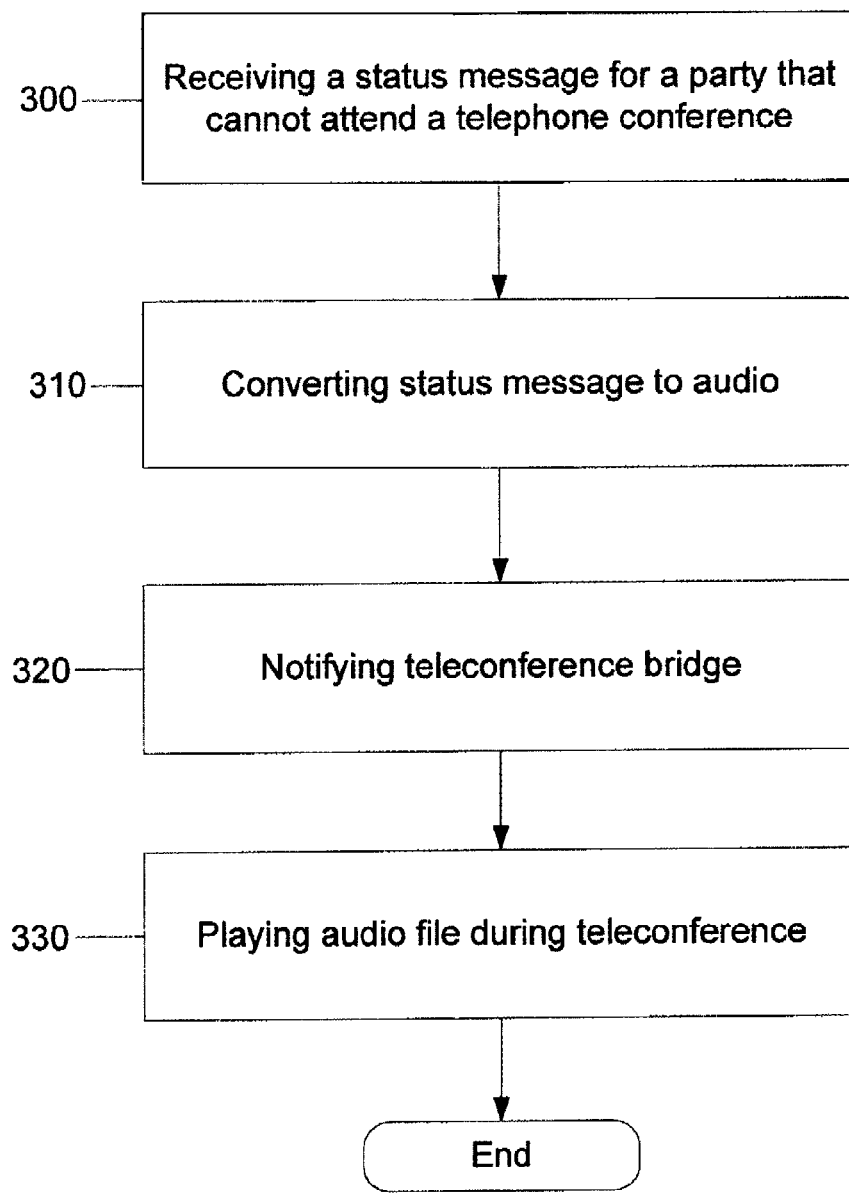
FIG. 3 illustrates a flow chart of a method according to one embodiment.

FIG. 3 is a flow chart illustrating a method for automatically playing the status of an absent party during a telephone conference, according to one embodiment. The method, at 300, includes receiving, at an e-mail server, a status message of a party to a telephone conference who cannot attend. In one embodiment, the status message includes a proxy indication that indicates that the party cannot attend the telephone conference. At 310, the status message is converted into audio that is saved in an audio file. In some embodiments, the conversion of the text into audio may include forwarding the status message to a voice box which converts the text of the status message into audio, saves the audio to a file, and returns the audio file to the email server.

Then, at 320, a notification is forwarded to a teleconference bridge indicating that the party associated with the status message will not be able to attend the telephone conference. In one example, the teleconference bridge creates an entry in a repository indicating that the party will need a voice proxy from the audio file. At 330, the audio file is played during the telephone conference in order to provide a voice indicator of the status of the party to other parties to the telephone conference.

It should be noted that many of the functional features described in this specification have been presented as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be partially implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve its stated purpose.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A non-transitory computer-readable medium having instructions stored thereon that, when executed by a processor, causes the processor to provide a telephone conference, the providing comprising:
   receiving a status message of a party to the telephone conference, wherein the telephone conference requires each party to the telephone conference to log-in before participating in the telephone conference, and the status message is sent as an email and is received before the party logs-in to the telephone conference;
   determining from the status message whether the party will be able to attend the telephone conference;
   when it is determined that the party cannot attend the telephone conference, converting the status message into audio that is saved in an audio file; and
   automatically log-in to the telephone conference for the party and notifying a teleconference bridge that the party associated with the status message will not be able to attend the telephone conference, wherein the teleconference bridge creates an entry in a repository indicating that the party will need a voice proxy from the audio file;
   wherein, during the telephone conference, the status of the party is provided to other parties to the telephone conference by playing the audio file.

2. The computer-readable medium according to claim 1, wherein the status message includes at least a proxy indication, and wherein the determining of whether the party will be able to attend the telephone conference is based on the proxy indication.

3. The computer-readable medium according to claim 2, wherein the proxy indication comprises a true or false indicator, and, when the proxy indication is true, the party associated with the status message cannot attend the telephone conference.

4. The computer-readable medium according to claim 1, wherein the status message comprises tags including at least one of meeting id, meeting passcode, name of party, status of party, proxy indication, status of project, or pending issues.

5. The computer-readable medium according to claim 4, wherein the teleconference bridge automatically logs-in for the absent party using the tags provided in the status message.

6. The computer-readable medium according to claim 5, wherein the teleconference bridge causes the name of the absent party to be stated upon log-in.

7. The computer-readable medium according to claim 1, wherein the audio file is automatically played immediately once all parties are logged-in to the telephone conference.

8. The computer-readable medium according to claim 1, wherein the audio file is played when the status is requested by an initiator of the telephone conference.

9. The computer-readable medium according to claim 1, wherein the audio file comprises a voice indicator that the party will be absent.

10. The computer-readable medium according to claim 1, wherein, when the telephone conference is complete, the entry in the repository is deleted.

11. The computer-readable medium according to claim 1, wherein the status message is generated by a software plug-in.

12. An apparatus, comprising:
    a receiver configured to receive a status message of a party to a telephone conference, wherein the telephone conference requires each party to the telephone conference to log-in before participating in the telephone conference, and the status message is sent as an email and is received before the party logs-in to the telephone conference;
    a processor configured to:
        determine from the status message whether the party will be able to attend the telephone conference;
        when it is determined that the party cannot attend the telephone conference, convert the status message into audio that is saved in an audio file; and
        automatically log-in to the telephone conference for the party and notify a teleconference bridge that the party associated with the status message will not be able to attend the telephone conference, wherein the teleconference bridge creates an entry in a repository indicating that the party will need a voice proxy from the audio file;
    wherein, during the telephone conference, the status of the party is provided to other parties to the telephone conference by playing the audio file.

13. The apparatus according to claim 12, wherein the status message includes at least a proxy indication, and wherein the determining of whether the party will be able to attend the telephone conference is based on the proxy indication.

14. The apparatus according to claim 12, wherein the status message comprises tags including at least one of meeting id, meeting passcode, name of party, status of party, proxy indication, status of project, or pending issues.

15. The apparatus according to claim 12, wherein the status message is generated by a software plug-in.

16. A computer-implemented method, comprising:
    receiving, at an e-mail server, a status message of a party to a telephone conference, wherein the telephone conference requires each party to the telephone conference to log-in before participating in the telephone conference, and the status message is sent as an email and is received before the party logs-in to the telephone conference;
    determining from the status message whether the party will be able to attend the telephone conference;
    when it is determined that the party cannot attend the telephone conference, converting the status message into audio that is saved in an audio file; and
    automatically log-in to the telephone conference for the party and notifying a teleconference bridge that the party associated with the status message will not be able to attend the telephone conference, wherein the teleconference bridge creates an entry in a repository indicating that the party will need a voice proxy from the audio file;
    wherein, during the telephone conference, the status of the party is provided to other parties to the telephone conference by playing the audio file.

17. The method according to claim 16, wherein the status message includes at least a proxy indication comprising a true or false indicator,
    wherein the determining of whether the party will be able to attend the telephone conference is based on the proxy indication, and
    when the proxy indication is true, the party associated with the status message cannot attend the telephone conference.

18. The method according to claim 16, wherein the status message comprises tags including at least one of meeting id, meeting passcode, name of party, status of party, proxy indication, status of project, or pending issues.

19. The method according to claim 18, wherein the teleconference bridge automatically logs-in for the absent party using the tags provided in the status message.

20. The method according to claim 16, wherein the audio file comprises a voice indicator that the party will be absent.

* * * * *